United States Patent [19]

Andre et al.

[11] E Patent Number: Re. 33,685

[45] Reissued Date of Patent: Sep. 10, 1991

[54] DRUM HOOP

[75] Inventors: Robert Andre, Hilton Head, S.C.; Alfred J. LeMert, Fort Myers, Fla.

[73] Assignee: The Selmer Company, L.P., New York, N.Y.

[21] Appl. No.: 469,741

[22] Filed: Jan. 19, 1990 (Under 37 CFR 1.47)

Related U.S. Patent Documents

Reissue of:

[64] Patent No.: 4,428,272
Issued: Jan. 31, 1984
Appl. No.: 324,003
Filed: Nov. 23, 1981

U.S. Applications:

[63] Continuation of Ser. No. 353,217, May 18, 1989, abandoned, which is a continuation of Ser. No. 825,015, Jan. 31, 1986, abandoned, which is a continuation of Ser. No. 89,512, Oct. 30, 1979, abandoned.

[51] Int. Cl.[5] ..... G10D 13/02
[52] U.S. Cl. ..... 84/413
[58] Field of Search ..... 84/411-420

[56] References Cited

U.S. PATENT DOCUMENTS

| | | | |
|---|---|---|---|
| 570,693 | 11/1896 | Bemis | 84/411 R |
| 794,658 | 7/1905 | Boulanger | 84/411 R |
| 899,450 | 9/1908 | Hemberger | 84/415 |
| 899,488 | 9/1908 | Hemberger | 84/411 R |
| 1,031,032 | 7/1912 | Wanamaker | 84/411 R |
| 1,121,909 | 12/1914 | Elkins et al. | 84/411 R |
| 1,597,026 | 8/1926 | Egermayer | 84/411 R |
| 2,779,227 | 1/1957 | Slingerland | 84/411 R |
| 3,376,777 | 4/1968 | Becker-Ehmck | 84/419 |
| 3,435,723 | 4/1969 | Corder | 84/411 R |
| 3,492,904 | 2/1970 | Koishikawa | 84/411 R |
| 4,282,793 | 8/1981 | Muchnick | 84/414 |

*Primary Examiner*—Lawrence R. Franklin
*Attorney, Agent, or Firm*—Nixon & Vanderhye

[57] ABSTRACT

A drum hoop for a musical drum, at times referred to as a "counter hoop," which hoop includes a reinforcing channel member and a reinforcing rim. The drum counter hoop retains a drum head with an associated locking member, or ring, by fastening lugs or the like secured to the drum shell and by suitable fastening means such as threaded bolts with nut-type heads thereon, sometimes referred to as tension screws, or rods, which engage with the hoop. The lugs are internally threaded or provided with extensions for threads to engage with the bolts. The drum hoop and drum shell are, therefore, provided with means for adjusting or changing the tension of the drum head by tightening or loosening the bolts which changes the position of the hoop and the drum head locking member with respect to the drum shell. The reinforced construction permits the drum head to be provided with a very high tension without bending or breaking the drum hoop.

6 Claims, 1 Drawing Sheet

FIG. 1
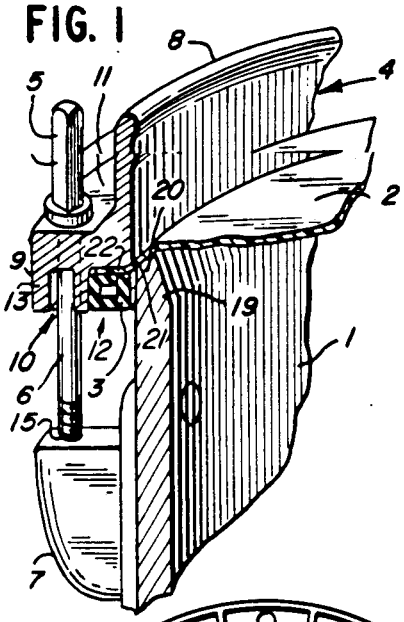
FIG. 2
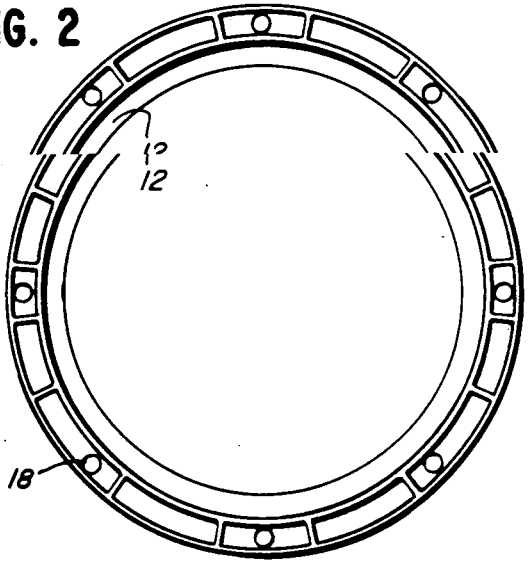
FIG. 4
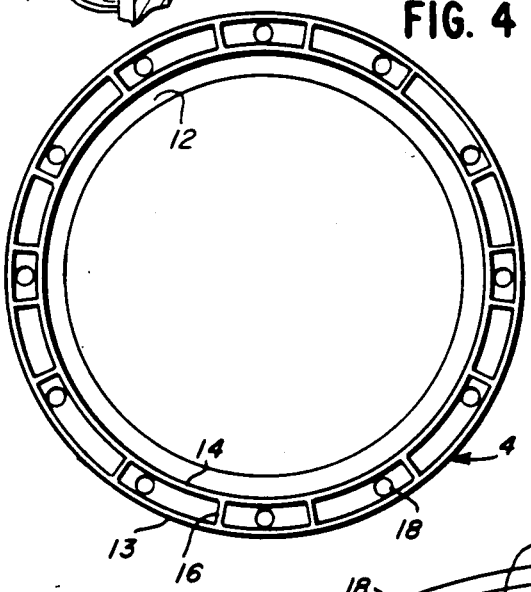
FIG. 3
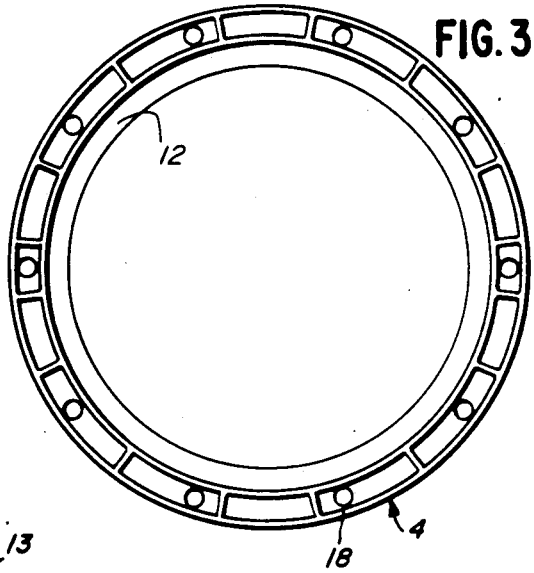
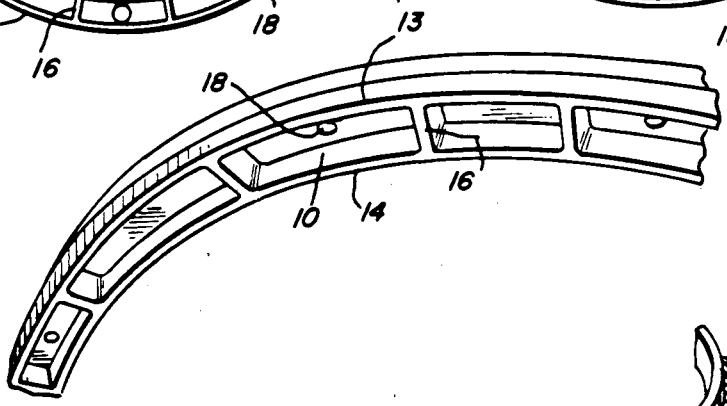
FIG. 5
FIG. 6
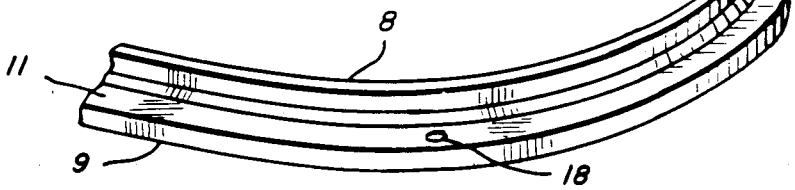

DRUM HOOP

Matter enclosed in heavy brackets [ ] appears in the original patent but forms no part of this reissue specification; matter printed in italics indicates the additions made by reissue.

RELATED APPLICATION

[This] *This is a continuation of application Ser. No. 07/353,217, filed May 18, 1989, now abandoned which is a continuation of Ser. No. 06/825,015, filed Jan. 31, 1986, now abandoned, which* is a continuation of application Ser. No. 089,512, now abandoned filed Oct. 30, 1979, the teachings of which are incorporated herein.

BACKGROUND OF THE INVENTION

The present invention relates to a new and improved hoop construction for musical drums, which hoop construction is adjustable with respect to the shell of the drum, so as to vary the tension of the drum head which is struck by the player usually by drum sticks or the like in order to produce drum sounds.

Drum hoops have been used for many years for this purpose. However, the modern musician playing drums is desirous of tightening the drum head to an extent not previously generally used in order to provide a different and louder drum beat or sound. The result of this very high tension with the hoops now used is that the hoops are not of sufficient strength to withstand the enormous pressures placed upon them and, as a result, they are bent out of shape, with the result that the hoop becomes useless for providing its intended purpose and must be replaced at considerable cost.

SUMMARY OF THE INVENTION

The primary object of the present invention is to provide a new and improved drum hoop for a percussion type musical drum which is stronger than previous hoops and is not only inexpensive to construct but also adapted to be used with drum tightening devices which permit the user of the drum to tighten the drum head to a very high degree of tension.

It is also an object of the invention to provide a reinforced drum hoop construction of the type referred to, wherein the hoop is designed so that various hole patterns may be utilized with the same hoop for the insertion of a different number of bolts to cooperate with the drum hoop and with drum lugs secured to the shell of the drum. The hoop is generally a metal casting.

It is also an object of the invention to provide an improved and stronger drum hoop than those available in the prior art in an inexpensive and expedient manner.

BRIEF DESCRIPTION OF THE DRAWINGS

FIG. 1 is a partial sectional perspective view of a drum hoop secured to a drum shell and illustrates the invention;

FIGS. 2, 3 and 4 are plan views of the drum hoop looking upwardly showing the location of an "8" hole pattern, a "10" hole pattern, and a "12" hole pattern, respectively;

FIG. 5 is a partial perspective view of the top drum hoop looking upwardly with respect thereto; and FIG. 6 is a partial perspective view of the same hoop looking downwardly thereon.

DESCRIPTION OF THE PREFERRED EMBODIMENT

Numeral 1 designates the shell of the drum which is shown in partial perspective in FIG. 1, which shell may be formed of any suitable material such as wood, metal or plastic, for example. A drum head generally indicated at 2 may be formed of a material known by the trademark MYLAR which is a trademark of E. I. Dupont de Nemours & Co. Other materials may be used and skins of animals suitable for this purpose are sometimes used for the drum head. The drum head 2 is strong, stretchable, and tensionable. Peripheral edges 22 of the drum head 2 are retained in a locking ring 3 in a manner, for example, such as that illustrated in Ludwig U.S. Pat. No. Re. 26,415 assigned to Ludwig Industries, the assignee of the present invention, and now expired.

A drum hoop 4, sometimes referred to as a counter hoop, usually formed of a single metal casting partially surrounds and overlays and engages the locking ring, or hoop, 3, of generally rectangular shape, and forces it downwardly with respect to the shell 1, as shown in FIG. 1. It is understood that some drums have a top and bottom drum head 2 and that the same construction as illustrated in the present drawings is also usable at the bottom of the drum shell as well as the top thereof. The drum hoop 4 is secured in position to drum lugs 7, which in turn are secured to the drum shell 1 by any standard construction and are provided with an internally screw-threaded bore 15 in the lug 7 to receive a bolt 6 threaded at its lower portion which extends through holes, or apertures, 18 in the body portion 9 of the drum hoop 4. The body portion 9 is provided with a flat surface 11 with which a nut, or head, 5 which is part of bolt 6, engages. The nut, or head, 5 and the bolt 6 are at times referred to as tension screws, or rods, and comprise tensioning means. Rotation of the tension rods moves the drum hoop 4 relative to the shell 1 and to the ring 3. The drum hoop 4 is also provided with an upwardly extending strengthening rim 8, integral with hoop 4 and is provided with horizontal and vertical surfaces forming an inner channel 12 which engages with said ring 3 so that the ring is engaged on three sides by solid members including the drum shell, which prevent tilting movement of the ring 3 when the tensioning means is tightened. The drum hoop 4 is usually circular in shape, although other shapes may be and are at times used. The body portion 9 of the drum hoop 4 is provided with a pair of extensions 13 and 14, which provide a groove, or outer channel 10 for strengthening purposes. As best shown in FIGS. 2–5, the extensions 13 and 14 are provided with a plurality of internal and connecting reinforcing members 16 cast integrally with the extensions 13 and 14 to add further strength to the hoop 4 and particularly to the extensions 13 and 14.

As shown in FIGS. 2, 3 and 4, the reinforcing connecting members are so spaced around the periphery of the hoop that holes for various size drums or patterns may be provided without interfering with the reinforcing member 16 or vice versa. FIG. 2 shows a drum hoop 4 with eight holes 18, FIG. 3 a drum hoop with ten holes 18, and FIG. 4 with twelve holes 18. These are the usual patterns for different types of drums.

As shown in FIG. 1, the top of the drum shell 1 is provided with a pair of inclined surfaces 19 and 21 which join in an upwardly extending bearing surface 20, which surface is at the intersection of the surfaces 19 and 21 and is engaged by the drum head 2. The same construction may be provided at the bottom of the drum.

After the drum shell 1 is formed with the inclined surfaces 19 and 21 and the bearing surface 20 for the head 2, the head 2 with the locking ring 3 which is already assembled is placed on the drum shell and the hoop 4 is then positioned to engage the drum head ring 3. The bolts 6 are threaded into the threaded bores 15 in lugs 7, the bolts 6 being of sufficient length to extend through openings 18 in the channel 10 and the body 9 of the hoop 4 and into the threaded bores. The drum nuts 5 and bolts 6 at all of the positions around the periphery of the hoop 4 are then tightened, usually by use of a special tool provided for this purpose. The force applied by the tool, and therefore to the drum nuts 5 will determine the force with which the hoop 4 forces the locking ring 3 downwardly as shown in FIG. 1 and will increase or decrease the tension of the head 2 as it is drawn over the bearing surface 20 of the drum shell 1.

With the construction disclosed, the player of the drum is enabled to apply extremely high tension to the head 2, so that louder and different notes may be sounded when the head 2 is struck by a drum stick or other suitable object. Since the drum hoop 4 is provided with the heavy reinforced construction, including the extensions 13 and 14 which form the channel 10 and the cross reinforcing members 16, it is extremely strong and ordinarily will not bend or [beak] *break* before the bolt 6 is broken by the pressure applied by the tightening tool for the nuts 5.

Since it is very important in the use of the drum in modern times to have the drum head 2 extremely tight for some purposes, the invention provides for such extreme tightening without failure of the drum hoop, which is expensive to replace and also renders the drum practically useless if it bends or breaks while the user is tightening the drum hoop preparatory to or during the use of the drum.

From the foregoing it will be apparent that we have provided a drum hoop of improved construction which will withstand excessive or extremely high stresses and strains without bending or breaking so that the tension on the drum can be extremely high if the player so desires.

Various modifications may be made in the form of the inventions without departing from the principles disclosed in the foregoing. It is our intention therefore that the accompanying claims be construed as broadly as possible consistent with the prior art.

What is claimed is:

[1. A counter hoop for a musical drum, said drum comprising a flexible and tensionable drum head including a peripheral edge, a locking ring secured to the peripheral edge of the drum head, a shell having at least one surface with which said drum head contacts and against which it is held tightly when the drum is assembled, adjustable head tensioning means for varying the tension of the drum head by drawing it over said shell contact surface, said loop comprising a main body portion, including an inner channel, and an outer channel formed by a pair of extensions extending from the main body portion, said outer channel comprising a smooth outer surface substantially free of protuberances extending therefrom, one of said extensions together with a surface of said counter hoop and the drum shell being in substantial flat surface contact with three sides of said head channel to prevent rotation of the same when tension is applied to said tensioning means.]

[2. A counter hoop as claimed in claim 1 wherein reinforcing means are provided for said outer channel.]

[3. A counter hoop as claimed in claim 2 wherein a plurality of apertures are formed in the body portion of the hoop through which a plurality of threaded bolts extend to engage a like plurality of threaded members which are fixed relative to the drum shell.]

4. A counter hoop as claimed in claim [3] *9* wherein *a* nut-like [members are] *member is* secured to the top of *each of* the bolts and [include] *includes* a lower, substantially flat surface and a *corresponding* substantially flat surface formed on said *main* body [portion] of the hoop with which said flat [surfaces] *surface* of said nut-like [members engage] *member engages.*

[5. A counter hoop as claimed in claim 3 wherein said apertures are positioned so as not to pass through said reinforcing means.]

6. A counter hoop as claimed in claim [2] *9* said outer channel reinforcing means comprises a plurality of cross connections which are case integrally therewith.

[7. A counter hoop as claimed in claim 1 wherein a plurality of apertures are formed in the body portion of the hoop through which a plurality of threaded bolts extend to engage a like plurality of threaded members which are fixed relative to the drum shell.]

[8. A counter hoop as claimed in claim 1 wherein said hoop is formed with an integral reinforcing member extending outwardly therefrom in a direction generally opposite to said pair of extensions.]

*9. A musical drum comprising*

*a flexible and tensionable drum head including a peripheral edge,*

*a locking ring secured to the peripheral edge of the drum head,*

*a shell having at least one surface, said drum head lying in contact with said one surface and held tightly thereagainst when the drum is assembled,*

*adjustable head tensioning means for varying the tension of the drum head by drawing it over said one shell contact surface, comprising:*

*a counterhoop comprising an annular main body having first and second radially spaced annular extensions extending from said main body in the same axial direction, said first and second extensions and a first portion of said main body defining an outer channel, said second extension and a second portion of said main body defining an inner channel,*

*said first extension having a smooth outer surface substantially free of protuberances extending therefrom,*

*said second extension, together with said second main body portion and the drum shell being in substantial flat surface bearing engagement with three sides of said locking ring to prevent rotation of the same when tension is applied to said tensioning means, and*

*reinforcing means extending in said outer channel between said first and second extensions thereof at circumferentially spaced positions about said hoop, a plurality of holes formed in said first body portion of the hoop through which a plurality of threaded bolts extend to engage a like plurality of threaded members which are fixed relative to the shell, said reinforcing means being circumferentially spaced one from the*

*other so that holes equally spaced one from the other about said hoop and numbering eight, ten or twelve may be provided without interfering with said reinforcing means.*

*10. A counter hoop as claimed in claim 9 wherein the number of apertures is eight.*

*11. A counter hoop as claimed in claim 9 wherein the number of apertures is ten.*

*12. A counter hoop as claimed in claim 9 wherein the number of apertures is twelve.*

* * * * *